(12) United States Patent
Bower et al.

(10) Patent No.: US 8,654,513 B2
(45) Date of Patent: Feb. 18, 2014

(54) REMOTELY-OPERATED SWITCHGEAR RACKING DEVICE AND A MOUNTING METHOD FOR THE SAME

(75) Inventors: Andrew Bower, Amherst, NH (US); Michael Murray, Durham, NC (US)

(73) Assignee: ABB Inc., Cary, NC (US)

( * ) Notice: Subject to any disclaimer, the term of this patent is extended or adjusted under 35 U.S.C. 154(b) by 224 days.

(21) Appl. No.: 13/368,440

(22) Filed: Feb. 8, 2012

(65) Prior Publication Data

US 2012/0199450 A1    Aug. 9, 2012

Related U.S. Application Data

(60) Provisional application No. 61/441,005, filed on Feb. 9, 2011.

(51) Int. Cl.
*H02B 11/00* (2006.01)

(52) U.S. Cl.
USPC .................. 361/607; 361/606; 200/50.24

(58) Field of Classification Search
USPC ............... 361/605–609, 614–616; 200/50.21, 200/50.23–50.26
See application file for complete search history.

(56) References Cited

U.S. PATENT DOCUMENTS

| | | | |
|---|---|---|---|
| 5,453,587 A * | 9/1995 | Hurley et al. ............ 200/50.24 | |
| 5,477,017 A | 12/1995 | Swindler et al. | |
| 6,777,627 B1 | 8/2004 | Stevenson | |
| 6,897,388 B2 * | 5/2005 | Greer ............................ 200/200 | |
| 6,951,990 B1 | 10/2005 | Miller | |
| 7,019,230 B1 | 3/2006 | Vail et al. | |
| 7,124,488 B2 | 10/2006 | Ford et al. | |
| 7,544,908 B2 | 6/2009 | Webb et al. | |
| 7,825,344 B2 | 11/2010 | Stevenson | |
| 8,054,606 B2 * | 11/2011 | Morris et al. ................. 361/115 |
| 8,063,323 B1 * | 11/2011 | Ledbetter ................... 200/50.21 |
| 8,151,452 B2 * | 4/2012 | Ledbetter ........................ 29/756 |
| 8,156,639 B1 * | 4/2012 | Ledbetter et al. ............... 29/764 |
| 8,161,631 B1 * | 4/2012 | Ledbetter et al. ............... 29/762 |
| 8,228,225 B1 * | 7/2012 | Ledbetter et al. ............. 341/176 |
| 8,261,433 B1 * | 9/2012 | Ledbetter et al. ............... 29/764 |
| 8,307,545 B1 * | 11/2012 | Ledbetter et al. ............... 29/762 |
| 8,325,078 B1 * | 12/2012 | Ledbetter et al. ............ 341/176 |
| 8,395,065 B2 * | 3/2013 | Zylstra et al. .............. 200/50.24 |
| 8,446,709 B2 * | 5/2013 | Beaver .......................... 361/606 |
| 8,537,518 B2 * | 9/2013 | Morris et al. ................. 361/115 |
| 8,553,394 B2 * | 10/2013 | Hawkins et al. .............. 361/608 |
| 2012/0055766 A1 * | 3/2012 | Greer et al. ................. 200/50.24 |

* cited by examiner

*Primary Examiner* — Robert J Hoffberg
(74) *Attorney, Agent, or Firm* — Melissa J. Szczepanik

(57) ABSTRACT

A motor box is used to rack withdrawable devices into or out of the associated cell in a switchgear cabinet. A hand held control is used to operate the motor box from a remote location. The motor box is attached to a mounting assembly on the switchgear cabinet door. The assembly can be part of the door or separately attached to the door. The mounting assembly allows for easy alignment of the motor box to the door and prevents rotation of the motor box when the box is latched to the mounting assembly. A cart is used to transport the motor box, remote control and associated peripherals to and from the switchgear cabinet.

19 Claims, 6 Drawing Sheets

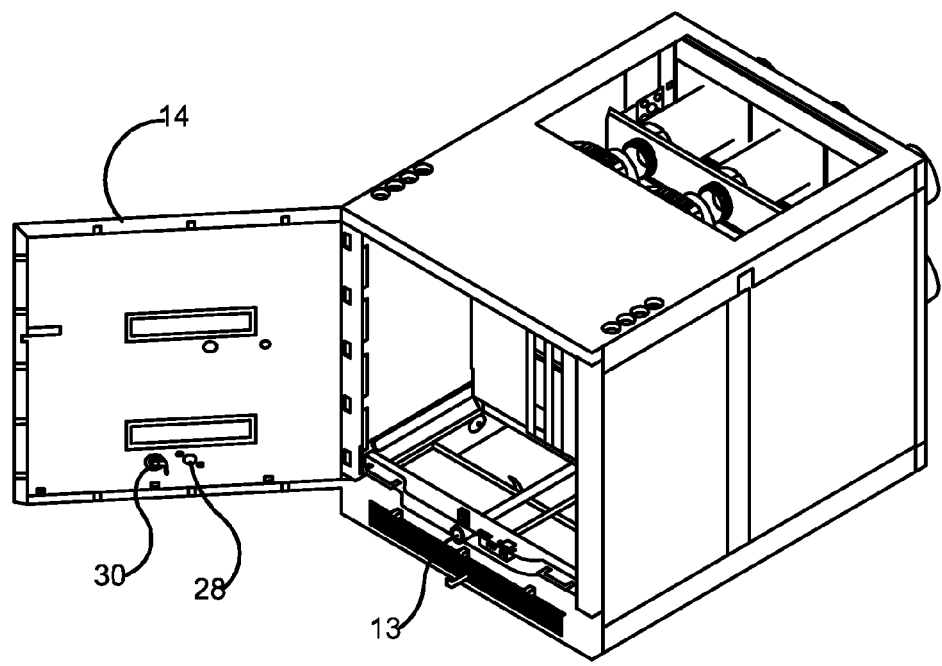
FIG. 2A
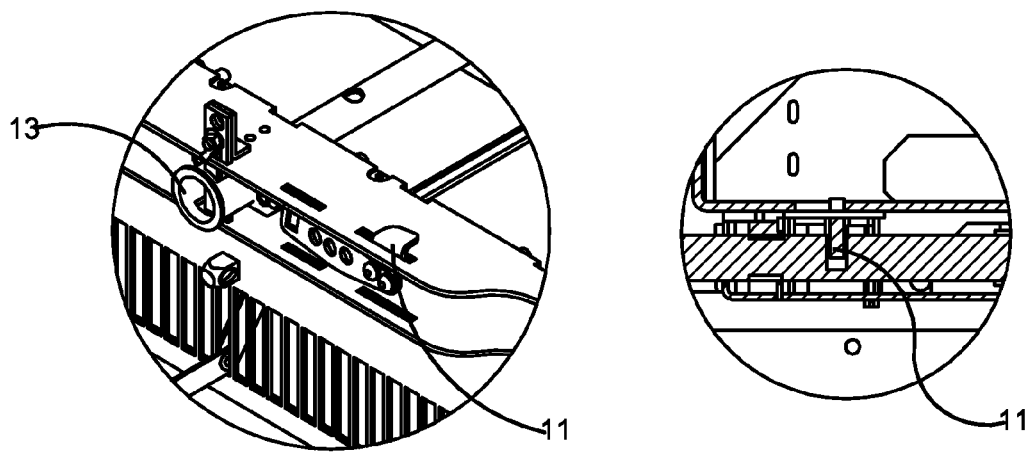
FIG. 2B
FIG. 2C

REMOTELY-OPERATED SWITCHGEAR RACKING DEVICE AND A MOUNTING METHOD FOR THE SAME

CROSS REFERENCE TO RELATED APPLICATION

This application claims the benefit of U.S. provisional patent application No. 61/441,005 filed on Feb. 9, 2011, which is hereby incorporated by reference in its entirety.

FIELD OF INVENTION

The present application is directed to a remotely-operated racking system for racking withdrawable devices housed within switchgear cells and a mounting method for the remotely-operated racking device.

BACKGROUND

Withdrawable devices housed within a medium-voltage switchgear framework are periodically disconnected for maintenance, testing or replacement. This disconnection of the withdrawable device from the switchgear is known as "racking out". Connection of the withdrawable device to the switchgear is known as "racking in".

Manual racking of a withdrawable device is labor intensive and dangerous due to the potential for an arc flash. The operator who performs the manual racking must wear bulky personal protective equipment (PPE) while conducting the racking operation to prevent injury or death, should an arc flash occur. An arc flash occurs when electric current passes through the air between ungrounded conductors or between ungrounded conductors and grounded conductors. Arc flashes are fatal within a distance of ten feet and cause severe burns due to the extreme temperatures. Motorized racking equipment is available, but is heavy and difficult to align with a switchgear cabinet, requiring lifting equipment and meticulous alignment steps.

SUMMARY

The present invention is a remotely-operated racking system and a mounting method for the racking device motor box. The racking system includes a motor box, hand-held remote controller for operating the motor box, and a mounting assembly for attaching the motor box to a switchgear cabinet door.

The racking device motor box has a mechanism for disengaging the interlock and for rotating the racking screw of a withdrawable device. The interlock must be disengaged before the racking operation commences. The mechanism for disengaging the interlock of a withdrawable device is comprised of a linear actuator that powers a pivoting release lever to contact and disengage the interlock lever on the front face of a switchgear cabinet. Once the interlock has been disengaged, the racking mechanism comprised of a motor, gearbox, motor coupling, and socket piece, is attached to the racking screw of a withdrawable device and rotates the racking screw to rack the withdrawable device into or out of the switchgear cell.

A remotely operated hand-held controller allows the operator to manage the entire racking operation from a safe distance. The controller has menu options for performing interlock actuation, displacement of a withdrawable device from a switchgear cell and insertion of a withdrawable device into a switchgear cell. The display screen of the controller depicts the status of the racking operation while it is in progress.

The present invention encompasses a mounting assembly for securing the racking device motor box to a switchgear cabinet door. The steps involved in mounting the racking device to a switchgear cabinet door include: attaching the mounting assembly to the switchgear cabinet door, moving the motor box to the height of the desired switchgear cell, placing the motor box apertures over the receiving pins of the mounting assembly, and attaching the motor box rotary latches to the brackets of the mounting assembly. A stable connection is then formed between the motor box and switchgear cabinet door, preventing the rotation of the racking motor and damage to the cabinet door.

BRIEF DESCRIPTION OF THE DRAWINGS

In the accompanying drawings, structural embodiments are illustrated that, together with the detailed description provided below, describe exemplary embodiments of a remotely-operated racking system and a mounting method for the racking device. One of ordinary skill in the art will appreciate that a component may be designed as multiple components or that multiple components may be designed as a single component. For example, the mounting method utilizes a mounting assembly comprised of components that may be attached to a plate or attached directly to a switchgear cabinet door.

Further, in the accompanying drawings and description that follow, like parts are indicated throughout the drawings and written description with the same reference numerals, respectively. The figures are not drawn to scale and the proportions of certain parts have been exaggerated for convenience of illustration.

FIG. 2a is a perspective view of a switchgear cabinet cell with the door open.

FIG. 2b is a detailed view of the racking screw and the interlock lever of the withdrawable device.

FIG. 2c is a detailed view of the withdrawable device interlock.

DETAILED DESCRIPTION

Figure 1A:
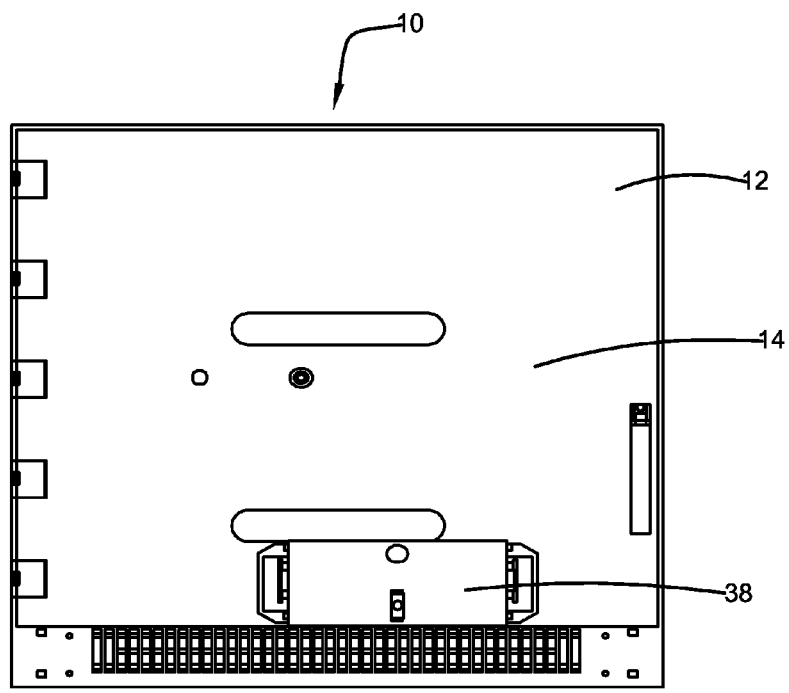
FIG. 1a is a perspective view of a switchgear cabinet having a cell to house a withdrawable device.
Figure 1B:
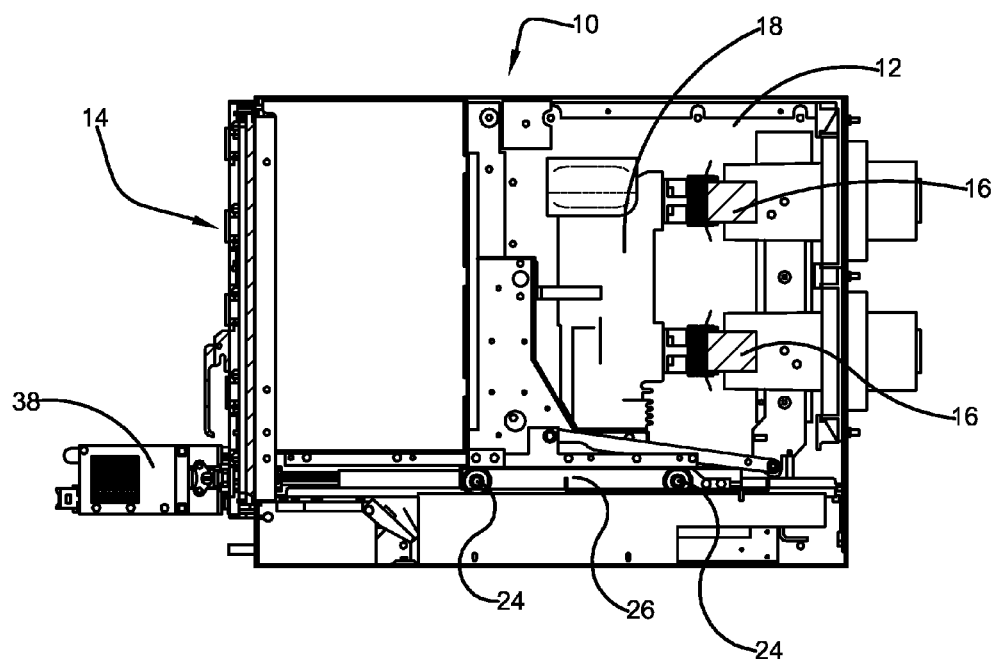
FIG. 1b is sectional side view of a switchgear cabinet showing a withdrawable device in connection with the electrical conductors of the switchgear cell.

Referring to FIG. 1a, a switchgear cabinet 10 comprises a cell 12 or bank of cells 12 for housing withdrawable devices, one example of which is shown in FIG. 1b. A withdrawable device 18 includes any device that can be used with medium-voltage switchgear or motor control centers. Examples of withdrawable devices 18 include but are not limited to: circuit breakers, motor contactors or draw-out motor controls. The switchgear cabinet 10 has a door 14 that encloses each cell within a switchgear framework. With reference now to FIG. 1b, each of the withdrawable devices 18 have wheels 24 and can be withdrawn horizontally from the switchgear cabinet 10 along tracks 26 inside the switchgear cell 12. When the withdrawable device 18 is in connection with the switchgear, it contacts the electrical conductors 16 of the switchgear cell 12.

Most withdrawable devices 18 have an interlock 11, as depicted in FIG. 2c. The interlock 11 acts as a safety mechanism that until it is disengaged prevents the withdrawable device 18 from being racked out from or racked in to the switchgear cell 12. Referring now to FIG. 2a, the switchgear cabinet door 14 has an opening 30 for accessing the interlock of a withdrawable device 18. Each withdrawable device 18 has a racking screw 13 as shown in FIGS. 2a and 2b which when rotated either racks out or racks in the withdrawable device 18. The racking screw 13 is rotated counter-clockwise to rack out the device and is rotated clockwise to rack in the device. The switchgear cabinet door 14 also has an opening 28 for accessing the racking screw 13.

Figure 3A:
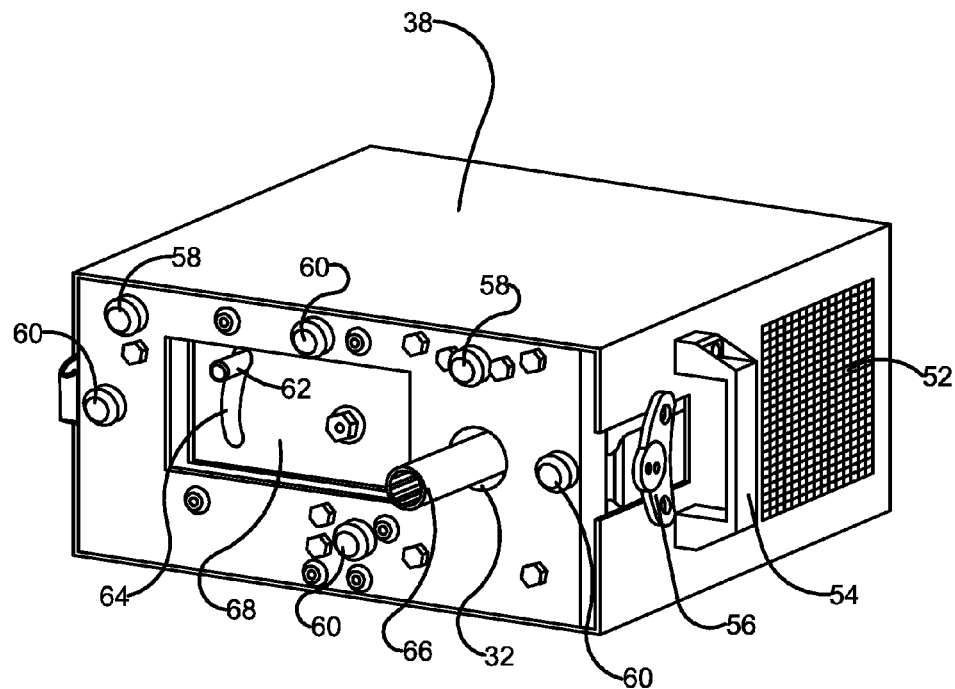
FIG. 3a is a front view of the motor box depicting the recess and slot for the interlock actuation lever mechanism, the rotating socket piece for the racking mechanism, compressible pads, rotary latches and handles.
Figure 3B:
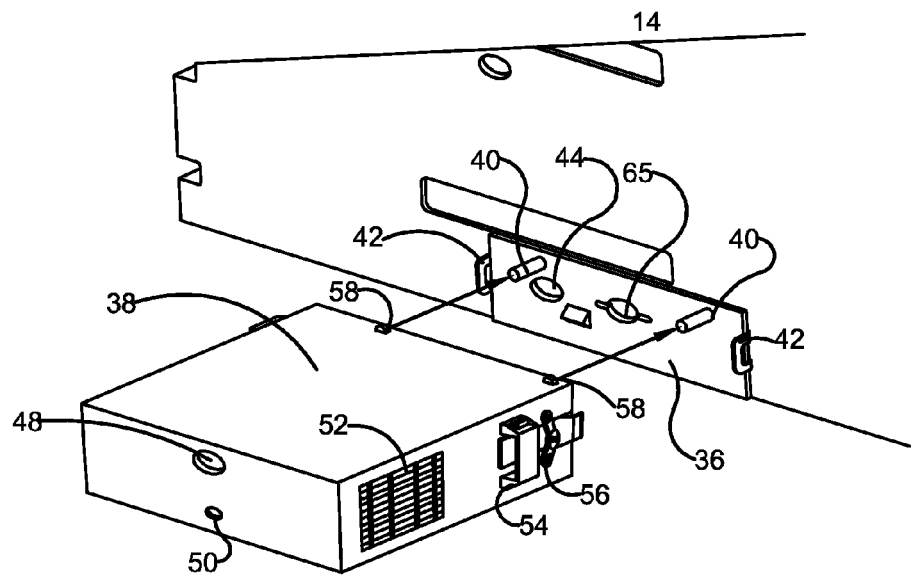
FIG. 3b is a perspective view of the alignment of the motor box with the mounting assembly attached to the switchgear cabinet.

With reference now to FIGS. 3a and 3b, the two figures show a motor box 38 that as is described below is attachable to a closed switchgear cabinet door 14 of a withdrawable device cell 12. The box 38 when so attached is remotely operated to rack in and rack out a withdrawable device 18 from the switchgear cabinet 10. FIG. 3a shows the front, right side and top faces of the motor box 38 and FIG. 3b shows the rear, left side and top faces of the motor box 38. The bottom face is not shown as it is substantially identical to the top face. FIG. 3b also shows a mounting assembly 36 attached to the switchgear cabinet door 14. The mounting assembly 36 is used to anchor the motor box 38 to the cabinet door 14 during the racking operation and will be described in further detail below.

Referring now to FIG. 3a, the front face of the motor box 38 has at least four rubber pads 60, with one of said rubber pads 60 disposed proximate to each side edge or corner, a recess 68 for allowing the interlock actuation release lever 62 to extend, a crescent-shaped cut-out 64 through which the release lever 62 travels about its path, an opening 32 for receiving a socket attachment 66 and two openings 58 for connection with the mounting assembly 36. The right side face has a rotary latch 56 for attachment of the motor box 38 to the switchgear cabinet door 14, a handle 54 for lifting the motor box when aligning it with the cabinet door 14, and a vent 52 to prevent the motor from overheating.

Referring now to FIG. 3b, the back face of the motor box has an aperture 50 near the bottom edge for a connector that receives a cable and a red-yellow-green indicator light 48 near the top edge that indicates the status of the racking operation. When the indicator light 48 is illuminated with red, there is an error or fault in the racking operation such as the motor exceeding its torque limit. A yellow light serves as a warning that the motor box is in operation. A green light indicates that the motor box is powered and ready for use. The left side face of the motor box 38 is identical to the right side face and thus has a rotary latch 56, a handle 54 and a vent 52.

The motor box 38 is attached directly to a closed switchgear cabinet door 14 using the mounting assembly 36. As should be appreciated by one having ordinary skill in the art, the components of the mounting assembly such as the alignment pins 40 and brackets 42 may be attached to a plate that is connected to the cabinet door 14. The connection of the motor box 38 to the cabinet door 14 prevents the motor box from rotating and vibrating against the cabinet door while the withdrawable device 18 is being racked.

The anti-rotation feature of the racking system is achieved by fitting the motor box openings 58 and rotary latches 56 over a mounting assembly 36 having at least two alignment pins 40 to receive the motor box openings 58 and at least two brackets 42 to receive the rotary latches 56. With the rubber pads 60 in contact with the mounting assembly 36, each of the rotary latches is hand-tightened to engage the associated bracket 42. This action compresses the rubber pads 60 on the face of the motor box 38 between the motor box 38 and the mounting assembly 36, creating a firm connection to support the racking operation and prevent damage to the cabinet door 14. The mounting assembly 36 and motor box 38 remain immobile throughout the racking process. The socket attachment 66 contacts the racking screw 13 of the withdrawable device 18 through an opening 44 in the switchgear cabinet door 14, further accessible through an aligned opening on the mounting assembly 36. The interlock lever 65 of the switchgear cabinet is located to the right of the racking screw opening 44.

The motor box 38 is transported to the racking location by a cart 90 shown in FIGS. 6a and 6b and described below or by carrying it to the location of the switchgear. The heavy lifting and tedious manual alignment needed for the prior art racking devices is not required. The motor box 38 is light enough to be lifted by the operator to the desired height and aligned to receive in the openings 58 the alignment pins 40 on the mounting assembly 36. When so aligned, the motor box 38 is slid forward and the openings 58 receive the pins 40. After the motor box 38 is snug up against the mounting assembly 36 the rotary latches 56 are connected to the receiving brackets 42 of the mounting assembly 36 and locked in place.

When the mounting assembly 36 is embodied as a plate connected to the cabinet door 14, the plate may remain in position on the switchgear cabinet door 14 or it can be removed from the door to be used for racking another withdrawable device 18. The mounting assembly 36, in the form of a mounting plate or attachment of alignment pins 40 and brackets 42 directly to the switchgear cabinet door may be delivered as part of the door on some switchgear models. In older switchgear, the mounting plate may be retrofitted onto the cabinet door. Retrofitting the mounting plate requires removing the interlock lever 65 from the face of the switchgear cabinet door, attaching the mounting plate to the switchgear cabinet door and placement of the interlock lever 65 over the mounting plate.

Figure 4A:
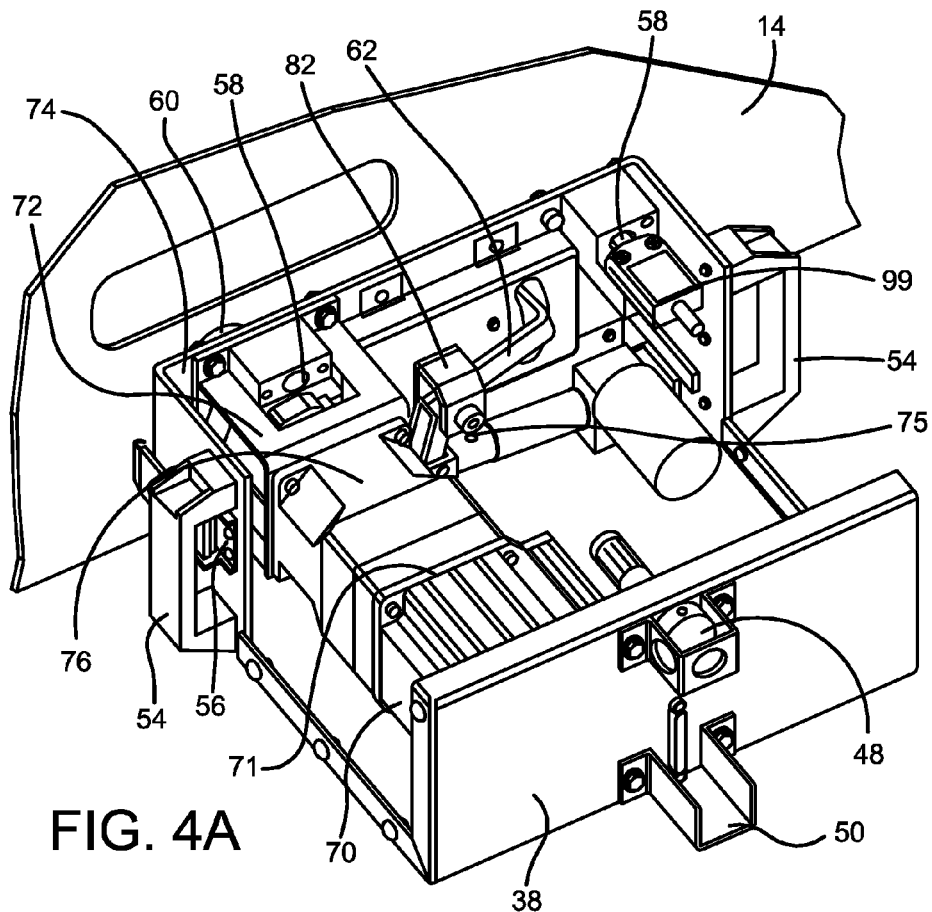
FIG. 4a is a perspective view of the motor box enclosing the racking mechanism and the interlock actuation lever mechanism.

In FIG. 4a, the motor box 38 is shown attached to the switchgear cabinet door 14 with the top and rear sides of the box removed so that the racking mechanism 71 and interlock actuation mechanism 75 housed within the motor box 38 can be seen. The racking mechanism 71 is comprised of a motor 70, gearbox 76, motor bracket 72, motor plate 74, coupling, shaft, and socket attachment 66. The motor 70 is attached to one end of the gearbox 76, and the other end of the gear box 76 is connected to the motor bracket 72. The motor bracket is attached to the inside front face of the motor box 38 by the motor plate 74. The motor bracket 72 provides enough space to fit the coupling between the gearbox 76 and the motor plate 74. The motor plate 74 connects both the racking mechanism 71 and the interlock actuation mechanism 75, to be described in further detail below, to the motor box 38.

The motor 70 has a socket attachment 66 as previously described and shown in FIG. 3a which attaches to the motor shaft and extends through an opening 32 on the front face of the motor box. The socket attachment 66 mates with the collar of the racking screw 13 of a withdrawable device 18. The motor 70 when energized provides the torque to rotate the motor shaft, socket attachment 66 and the racking screw 13. The withdrawable device 18 is then racked in a horizontal linear motion into or out of a switchgear cabinet cell 12.

The motor 70, in the present embodiment is available as Model No. SM34165DT from The Animatics Corporation of Santa Clara, Calif., and includes a logic device, communication board, power amplifier, encoder wheel and motion controller. The motor 70 is used to control the torque and speed of the racking operation. The motor 70 also provides feedback while in operation to a hand-held remote control shown in FIG. 5 which will be described in detail below.

A limit switch 99 detects whether the motor box 38 is mounted to the cabinet door 14. The limit switch 99 sends a signal to the controller regarding the location of the motor box 38 in relation to the cabinet door 14 to the controller 100. The limit switch is activated when in contact with the alignment pins 40 of the mounting assembly 36 or a protrusion on the face of the cabinet door 14.

Figure 4B:
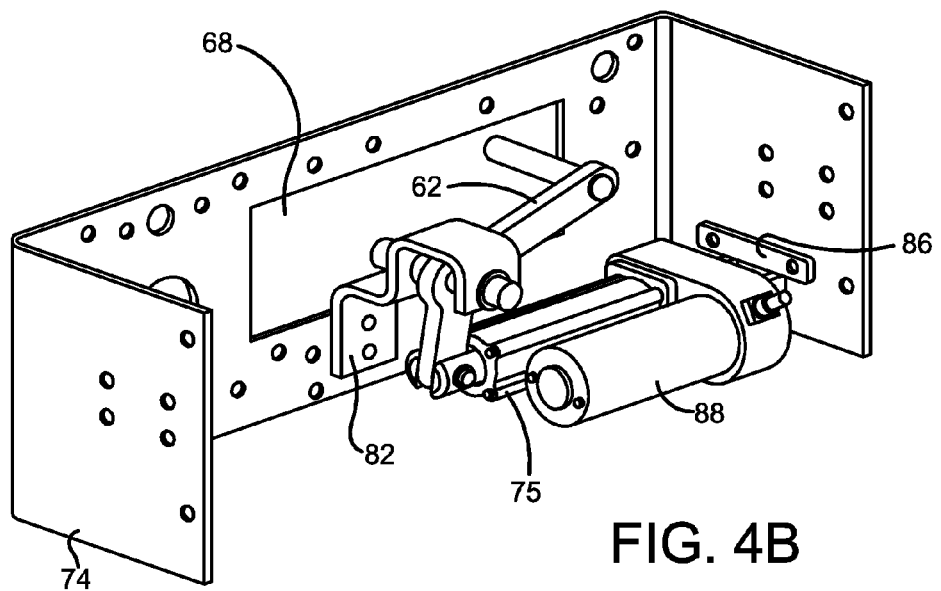
FIG. 4b is a perspective view of the motor box interlock actuation lever mechanism for disengaging the interlock of a withdrawable device.

Referring now to FIG. 4b, there is shown a motor plate 74 on which are mounted the mechanism for disengaging the interlock. This mechanism comprises a linear actuator 88, pivot bracket 82, and interlock actuation release lever 62. The linear actuator 88 is connected to the inside left side face of the motor plate 74 by a bracket 86 and to the inside front face of the motor box 38 by the pivot bracket 82. The pivot bracket 82 acts as the fulcrum about which the interlock actuation release lever 62 pivots. As is shown in FIG. 4a, the motor plate 74 is mounted inside the motor box 38 to the front face and to the right and left side faces.

When the interlock actuation mechanism 75 is triggered, the linear actuator 88 extends and pushes on the interlock actuation release lever 62 shown in FIG. 4b, causing the release lever 62 to move downward in the crescent-shaped path of the cut-out 64 shown in FIG. 3a. The interlock actuation release lever 62 applies a perpendicular force to the switchgear interlock lever 65 shown in FIG. 3b. Both levers pivot about the same axis, thus traveling in the same range of motion. As the switchgear interlock lever 65 is depressed, the connected latch on the inside of the switchgear cabinet contacts and releases the interlock 11 of the withdrawable device 18. The withdrawable device 18 may then be moved within the switchgear cabinet 10.

Occasionally, the switchgear interlock lever 65 may need to be returned to its original position after being depressed. This may be achieved by reversing the polarity of the direct current power source to obtain an upward movement of the interlock actuation release lever 62. The switchgear interlock lever 65 may return to its original position after the force applied by the release lever 62 is removed.

Figure 5:
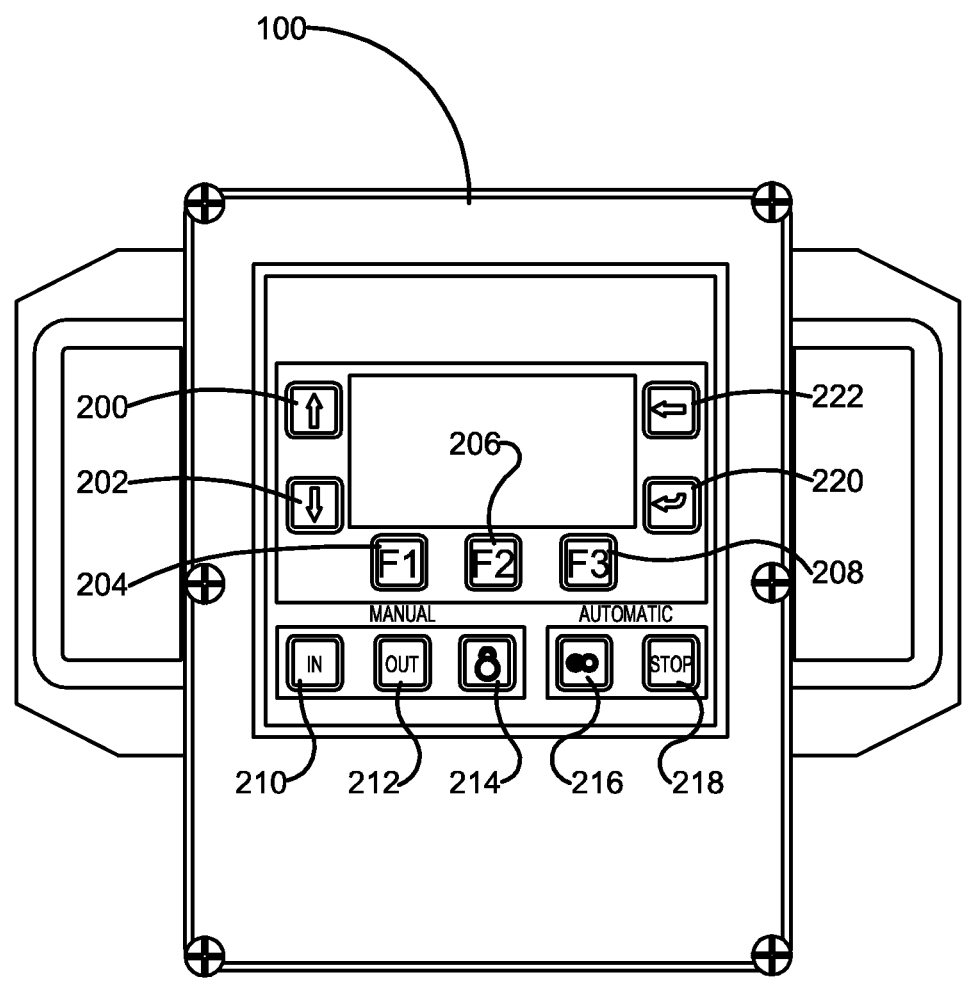
FIG. 5 is a front view of the hand-held remote control.

Referring to FIG. 5, a hand-held controller 100 is connected to the motor box 38 through a cable removeably linked to a connector seated in an opening 50 of the motor box 38. The controller 100 is also removeably attached to the cable and allows the operator to manage the racking procedure from a safe distance from the switchgear cabinet 14. In one embodiment that distance is at least ten (10) feet from the cabinet 14. The controller 100 communicates with both the interlock actuation and racking mechanisms of the motor box 38. The controller 100 is a programmable logic controller (PLC) with a liquid crystal display (LCD) screen enclosed by a frame having four sides and two handles. The controller 100 relays commands to and receives information from the racking motor 70 and the linear actuator 88. As should be appreciated by one having ordinary skill in the art, a wireless controller may be utilized in place of a cable for communication with the racking motor 70 and linear actuator 88 and a touch screen may be utilized on the controller 100.

The controller 100 has two modes of operation, automatic and manual. The arrow buttons 200, 202 on the left side of the controller 100 allow the user to scroll through lists of options. The function keys 204, 206, 208 allow the user to make selections within menu screens. The buttons on the right side of the controller 100 are the cancel/back button 222 and the enter button 220.

Automatic mode is the standard operating mode of the controller 100. The buttons corresponding specifically to automatic mode are the go and stop buttons 216, 218. The go button 216 commences the racking process and the stop button 218 allows the user to halt the process at any point. Operating the controller 100 in automatic mode guides the user through a series of sequential menu options. The initial menu screen requires the user to select the type of withdrawable device 18 being racked from a list of options using the arrow buttons 200, 202. The second menu screen requires the user to select the initial position of the withdrawable device 18 using the function keys 204, 206, 208 for the following options: test, connect, and disconnect. The third menu screen requires the user to select the final position of the withdrawable device 18 using the function keys 204, 206, 208 for the following options: test, connect, and disconnect. After the information is entered, the controller 100 sends a command to the motor 70 and a racking status screen appears on the controller, depicting the position of the withdrawable device 18 in relation to the switchgear cell 12 and a graphical display of torque experienced during the racking operation.

Manual mode allows the operator to directly control each step of the racking process. The manual mode buttons 210, 212, 214 on the controller 100 correspond to the manual modes of racking the withdrawable device 18 in, racking the withdrawable device 18 out, and disengaging the interlock, respectively. The operator may switch between manual and automatic mode. For example, if a power outage occurs during operation in automatic mode, manual mode may be used to move the withdrawable device 18 to a position where automatic mode may then be resumed.

The racking device motor 70 requires input from the controller 100 to perform the racking operation. After the user inputs the required menu selections, the controller 100 derives the operational parameters for the motor 70 programmatically by accessing a data table containing the attributes of compatible devices. The program reads the data table and returns only the entries corresponding to the particular withdrawable device 18 to be racked. The program then performs a series of calculations to determine the rotational speed, torque, and other parameters required for the motor 70 to rack the withdrawable device 18 between the initial and final positions selected by the user. If the threshold for any operational parameter is exceeded, the motor 70 will automatically halt.

An example of the data used by the controller 100 to derive operational parameters for the motor 70 follows. For a 63 kA circuit breaker, thirty-seven rotations of the racking screw 13 are required to rack the breaker from a position of connection within a switchgear cell to disconnection. The gearbox 76 that connects the motor 70 and the racking socket attachment 66 has a ratio of twenty-eight turns to one turn. As a result, the motor 70 has to rotate 1,036 times to rack the 63 kA circuit breaker. The motor 70 uses the feedback it receives from the encoder wheel to track the number of revolutions the motor 70 has made. Each revolution is interpreted by the encoder wheel as 8,000 counts per revolution, and therefore, thirty-seven rotations of the racking screw 13 equates to 8,288,000 encoder counts. The controller 100 then transmits the requirement of 8,288,000 encoder counts at a velocity of 3,607,809 encoder counts per second to the motor 70. The controller program reads the scaled velocity as 224,000 encoder counts per second and transmits this figure to the motor 70, resulting in the rotation of the racking screw 13 at sixty revolutions per minute. As should be appreciated by one having ordinary skill in the art, the motor 70 can be operated in constant torque mode or constant velocity mode during the racking operation.

The hand-held controller 100 communicates with the motor 70 by sending a signal through a cable to a relay that acts as a switch. The contacts of the relay close to complete the relay circuit and activate the motor 70. When operating in automatic mode, the Stop button 218 can be selected at any time to cut power to the motor 70. The Stop button functions as an emergency stop to halt the operation of the racking motor 70.

When the interlock actuation menu option is selected on the controller, a signal is sent through the cable to a relay. The contacts of the relay close to complete the relay circuit and power the linear actuator 88. The linear actuator 88 extends from a retracted position and pushes on the interlock actuation release lever 62. The release lever 62 pivots about the pivot bracket 82 and travels downward in a semi-circular motion, contacting and depressing the interlock lever 65 on the switchgear cabinet door 14.

Figure 6A:
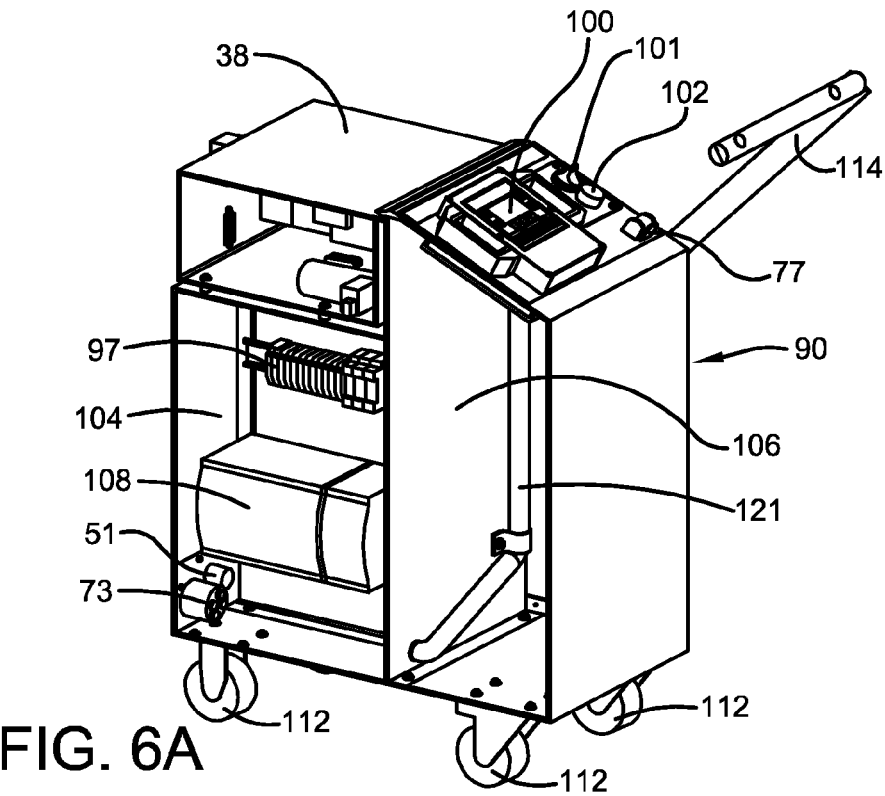
FIG. 6a is a perspective view of a cart for transporting the motor box, showing the storage of the hand-held controller and the mounting assembly for securing the motor box to the cart.
Figure 6B:
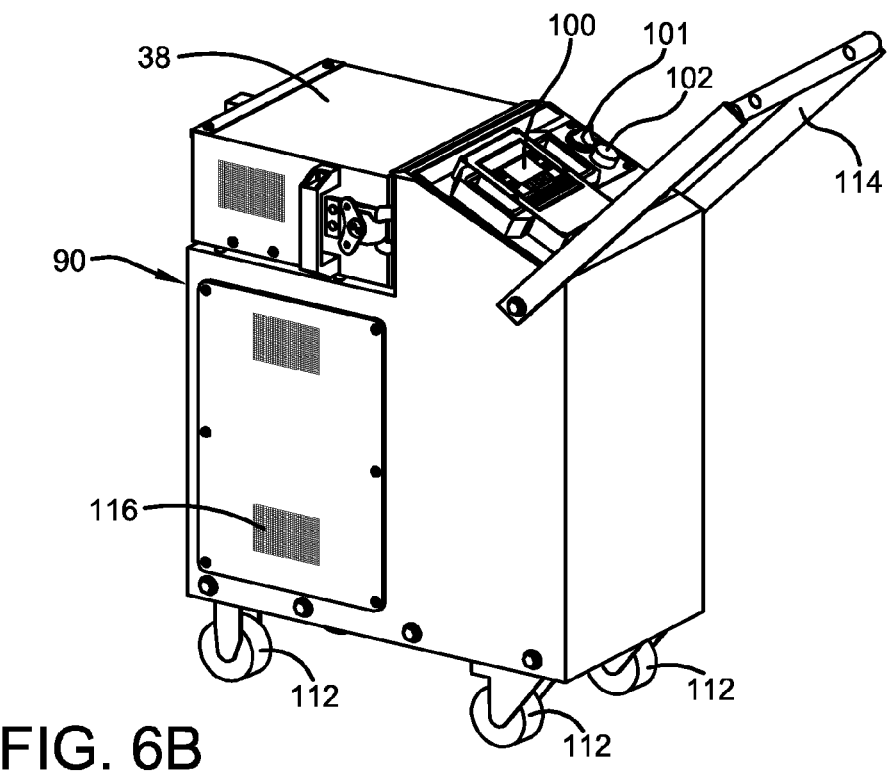
FIG. 6b is a perspective view of the racking system including the hand-held controller, motor box, and movable cart.

Referring now to FIGS. 6a and 6b, the electrical switchgear racking system is comprised of the racking device motor box 38, hand held controller 100, cart 90 and mounting assembly 36 for attaching the motor box 38 to the cart 90. The motor box 38, hand-held controller 100, and peripherals can be transported to the switchgear lineup using the cart 90. As shown in FIG. 6a, the cart 90 has storage areas 104, 106 for the control, power and motor cables including a conduit housing 121 for wires that run to a power switch 101 and indicator lights 102. The DC power supply 108 is located within a compartment 104 of the cart 90. A DIN rail 97 is provided inside compartment 104 for mounting the withdrawable devices 18 within the switchgear cabinet 10. A socket plug 73 for a power cord and a fuse 51 are also provided inside the compartment 104.

Referring now to FIG. 6b, the top face of the cart 90 has the power switch 101, indicator lights 102 for relaying the power status of the motor box 38, a recess for storing the hand-held remote control 100, and a handle 114 for pushing the cart 90. The top face also has a spare socket holder 77 for retaining spare socket attachments 66. The front and back faces of the cart 90 are comprised of a flat surface. The side faces are flat and have vents 116 proximate to the center. The bottom face of the cart 90 has at least four caster wheels 112 attached proximate to each corner.

While the present application illustrates various embodiments of a remotely-operated switchgear racking device and mounting method, and while these embodiments have been described in some detail, it is not the intention of the applicant to restrict or in any way limit the scope of the appended claims to such detail. Additional advantages and modifications will readily appear to those having ordinary skill in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A remotely-controlled system for moving a withdrawable device into and out of connection with electrical conductors in a switchgear cabinet cell associated with said withdrawable device, said withdrawable device having an interlock and a racking screw, said system comprising:
    a motor box for mounting on a switchgear cabinet door of said switchgear cabinet cell associated with said withdrawable device, said motor box comprising:
        an actuatable mechanism which disengages said interlock of the withdrawable device when said motor box is mounted on said switchgear cabinet cell and said actuatable mechanism is actuated;
        a racking mechanism for coupling with and rotating the racking screw of the withdrawable device to move said withdrawable device into or out of connection with said electrical conductors in said associated switchgear cabinet cell;
        a door mounting assembly for binding said motor box to said switchgear cabinet door to which said motor box is attached when said withdrawable device is to be moved into or out of connection with said electrical conductors in said associated switchgear cabinet cell, said door mounting assembly comprising:
            at least two pins projecting from a top edge of said door mounting assembly on said switchgear cabinet door for aligning and contacting said motor box with said switchgear cabinet door;
            at least one bracket on each side edge of said door mounting assembly for attaching said motor box to said switchgear cabinet door;
            an interlock aperture on a door front face of said switchgear cabinet door for accessing a interlock lever to lock into the interlock of the withdrawable device; and
            a screw aperture on said switchgear cabinet door front face for accessing said racking screw of said withdrawable device; and
    a hand-held controller for actuating said actuatable mechanism for disengaging the withdrawable device interlock and controlling said racking mechanism for turning the withdrawable device racking screw when the withdrawable device is to be moved into or out of connection with said electrical conductors.

2. The system of claim 1, wherein the actuatable mechanism comprises: a linear actuator having one end coupled to a release lever and an opposing end attached to said motor box; and said release lever pivotally mounted in said motor box, said release lever when pivoted by said linear actuator contacting and depressing the interlock lever on said switchgear cabinet cell for disengaging the interlock of said withdrawable device.

3. The system of claim 2, wherein upon actuation of said actuatable mechanism, said linear actuator elongates from a retracted position to cause said release lever to pivot and contact said interlock lever.

4. The system of claim 3, wherein said motor box has a motor box front face and said release lever extends through said motor box front face and when pivoted applies a perpendicular force to depress said interlock lever.

5. The system of claim 1, wherein said racking mechanism comprises:
    a motor and a connected shaft for providing rotational movement, said motor attached to said motor box; and
    a coupling for fastening the motor and the connected shaft to a socket attachment, said socket attachment for removable connection to said racking screw of said withdrawable device.

6. The system of claim 5, wherein said motor when activated transmits rotational force to said socket attachment when coupled to said racking screw to thereby move said withdrawable device from one of an initial position of connection to a final position of disconnection or an initial position of disconnection to a final position of connection with said switchgear cell electrical conductors.

7. The system of claim 1, wherein said motor box comprises: a motor box front face having at least two apertures each for receiving an associated one of said pins of said door mounting assembly and at least one compressible pad proximate to each edge of said motor box front face for compression when said motor box is firmly mounted to said door mounting assembly; and side faces having at least one latch mounted proximate to a side edge of each said side face for connection with said at least one bracket on said each side edge of said door mounting assembly.

8. The system of claim 7, wherein each of said at least one latch is rotationally applied to engage a corresponding one of said at least one bracket in a locking arrangement when said motor box is firmly mounted on said switchgear cabinet door.

9. The system of claim 1, wherein said hand-held controller sends signals to said motor box through a cable, said cable removeably attached on both ends to connect said motor box to said hand-held controller and electrically connect a motor box relay switch to a motor.

10. The system of claim 9, wherein said motor box relay switch receives said signals from said hand-held controller to open or close contacts of said motor box relay switch, and when closed, actuates said actuatable mechanism to disengage said interlock of said withdrawable device.

11. The system of claim 10, wherein said motor box relay switch receives said signals from said hand-held controller to open or close the contacts of said motor box relay switch, and when closed, powers said motor to move said withdrawable device into or out of connection with said electrical conductors of said withdrawable device.

12. The system of claim 11, wherein a display screen of said hand-held controller receives and interprets signals from said motor to depict the status of said actuatable mechanism, the status of said racking mechanism, and torque experienced by said motor during operation of said racking mechanism.

13. The system of claim 1, wherein said hand-held controller uses wireless communications to send signals to said motor box.

14. The system of claim 1, further comprising a cart to store and transport said motor box and said hand-held controller wherein said motor box is mounted to said cart using a cart mounting assembly substantially identical to the door mounting assembly used for securely binding said motor box to said switchgear cabinet door.

15. The system of claim 14, wherein said hand held controller is seated in a recess of said cart.

16. A mounting assembly for securely binding a switchgear racking device motor box to a switchgear cabinet door for the purpose of racking a withdrawable device within a switchgear cabinet cell, said mounting assembly comprising:
at least two pins projecting from a top edge of said mounting assembly for aligning and contacting said switchgear racking device motor box with the switchgear cabinet door;
at least one bracket on each side edge of said mounting assembly for attaching said switchgear racking device motor box to said switchgear cabinet cell door;
an interlock aperture for accessing an interlock lever on a front face of said switchgear cabinet door; and
a screw aperture for accessing a racking screw of said withdrawable device on said front face of said switchgear cabinet door.

17. A method of moving a withdrawable device into and out of connection with electrical conductors in a switchgear cabinet cell associated with said withdrawable device from a location remote from said switchgear cabinet cell, said method comprising:
connecting a mounting assembly to a switchgear cabinet door associated with said switchgear cabinet cell in a manner such that said mounting assembly is immobile, said mounting assembly comprising:
at least two pins extending from a top edge of said mounting assembly for aligning a motor box to said switchgear cabinet door;
at least two brackets, one of each said at least two brackets located on and extending from an opposing side edge of said mounting assembly;
affixing a motor box to said mounting assembly, said motor box comprising:
at least one latch disposed on each opposing side edge of a front face of said motor box, each of said at least one latch rotationally operable to connect said motor box to a corresponding bracket of said at least two brackets of said mounting assembly to thereby immobilize said motor box;
at least two motor box apertures disposed proximate to a top edge of said front face, each of said at least two motor box apertures for receiving a corresponding in of said at least two pins from said mounting assembly; and
at least one compressible pad disposed proximate to each edge of said front face for compression between said motor box and said switchgear cabinet door; and
operating a hand-held controller from the location remote from said switchgear cabinet cell to send an interlock signal to disengage an interlock of said withdrawable device and a motor signal to move said withdrawable device into or out of connection with said electrical conductors of said switchgear cabinet cell.

18. The method of claim 17, wherein each of said at least two pins are aligned with an associated one of said at least two motor box apertures, said each of said at least two pins entering said associated one of said at least two motor box apertures when said motor box is moved onto said mounting assembly.

19. The method of claim 17, wherein said withdrawable device is one or more withdrawable devices, said hand-held controller stores predetermined operating parameters of each of said one or more withdrawable devices compatible with said motor box and transmits said motor signal based upon the predetermined operating parameters of a selected one of said one or more withdrawable devices to a motor within said motor box to prevent operation of said motor outside said predetermined operating parameters.

* * * * *